United States Patent
Bricker

(10) Patent No.: US 6,283,454 B1
(45) Date of Patent: Sep. 4, 2001

(54) APPARATUS FOR FENCE REPAIR AND CONSTRUCTION

(76) Inventor: Leslie Steven Bricker, Box 1574, Gillette, WY (US) 82717

( * ) Notice: Subject to any disclaimer, the term of this patent is extended or adjusted under 35 U.S.C. 154(b) by 0 days.

(21) Appl. No.: 09/384,724

(22) Filed: Aug. 27, 1999

(51) Int. Cl.$^7$ .................................................. B66D 1/36
(52) U.S. Cl. ......................... 254/323; 342/403; 342/557
(58) Field of Search ........................... 254/323; 242/557, 242/560, 395, 395.1, 403, 406

(56) References Cited

U.S. PATENT DOCUMENTS

| | | | |
|---|---|---|---|
| 695,351 | * | 3/1902 | Thompson .......................... 242/403 |
| 875,476 | * | 12/1907 | Wasson ................................. 242/557 |
| 2,789,778 | * | 4/1957 | Zogg et al. ........................... 242/403 |
| 2,913,194 | * | 11/1959 | Garnett ................................. 242/557 |
| 2,914,270 | * | 11/1959 | Parker et al. ........................ 242/403 |
| 3,544,031 | * | 12/1970 | White .................................... 242/403 |
| 3,860,193 | * | 1/1975 | Green .................................... 242/557 |
| 3,937,414 | * | 2/1976 | Bank et al. ........................... 242/557 |
| 4,339,096 | * | 7/1982 | May ...................................... 242/557 |
| 4,854,521 | * | 8/1989 | Farnsworth ......................... 242/557 |
| 4,930,718 | * | 6/1990 | Lancour et al. ..................... 242/557 |
| 5,042,737 | * | 8/1991 | Sigle et al. ........................... 242/557 |
| 5,158,243 | * | 10/1992 | Segle et al. .......................... 242/557 |
| 5,163,634 | * | 11/1992 | Moom et al. ......................... 242/557 |
| 5,315,853 | * | 5/1994 | Scheiterle ............................. 242/557 |
| 5,316,232 | * | 5/1994 | Lambert, Jr. ........................ 242/557 |
| 5,568,900 | * | 10/1996 | Conroy ................................. 242/557 |
| 5,582,216 | * | 12/1996 | Smith et al. .......................... 242/557 |
| 5,632,470 | * | 5/1997 | Leland ................................. 242/385 |
| 5,904,314 | * | 5/1999 | Babcock, Jr. ........................ 242/557 |

FOREIGN PATENT DOCUMENTS

| | | | |
|---|---|---|---|
| 494785 | * | 7/1950 | (BE) ..................................... 242/395 |
| 2277316 | * | 10/1994 | (GB) ..................................... 242/557 |

* cited by examiner

Primary Examiner—Emmanuel M. Marcelo

(57) ABSTRACT

The present invention is a trailer for the repair and construction of fences used for example, to enclose farmland or livestock on a ranch. The trailer is a fully self-contained fencing apparatus which can be conveyed by various vehicles capable of traversing the terrain to be fenced. The trailer of the present invention is particularly useful for conserving expensive, heavy-duty conveyance vehicles such as 4-wheel drive pick-up trucks since it is a fully self-contained fencing apparatus and can easily be conveyed by smaller, less expensive vehicles such as ATVs (all-terrain vehicles). The trailer includes carriers such as tool boxes, mounting posts and mounting cylinders for carrying and storing fencing tools and materials. Discs for carrying and spooling out fence wire are mounted on the trailer and can be extended outward from the trailer such that numerous lines of fence wire can be spooled out simultaneously without the lines interfering with each other. The trailer has a hitch mounted on a tongue for connecting to a vehicle. A jack is mounted on the tongue of the trailer which is used to jack up the trailer and disconnect it from the vehicle. The jack permits the trailer to be secured and left in the field after a fencing period is complete such that fencing can be immediately resumed at some later time without the need to again gather together all the necessary fencing tools and materials.

9 Claims, 3 Drawing Sheets

APPARATUS FOR FENCE REPAIR AND CONSTRUCTION

FIELD OF THE INVENTION

The present invention relates generally to livestock enclosures. More specifically, the invention relates to an apparatus which facilitates the efficient construction and repair of fences used to enclose farmland or livestock on a ranch.

BACKGROUND OF THE INVENTION

Various devices exist for dispensing wire used to construct fences for enclosing livestock and farmland. These devices are often difficult to use, include complex wire-tensioning systems which make them expensive to manufacture, or are limited to dispensing a single type of wire or a single spool of wire at once. Additionally, these devices are not fully self-contained fencing apparatuses in that they do not provide all the materials and tools necessary to completely install a fence or repair a downed fence. Another disadvantage of these devices includes a need to have pre-installed fence posts to which the dispensed and tensioned fence wire can be attached. To fully construct or repair a line of fence thus requires that at least two trips along the fence line be made. The first trip is necessary to dig fence post holes and place fence posts into the ground, and the second trip is made to dispense, stretch, and attach the fence wire to the fence posts. The inefficient process of making two trips along a long line of fence is especially notable on a large acre ranch or farm and is not highly expedient in installing or repairing fences. Additionally, prior art devices are not capable of assisting in the repair of downed fencing where tools and materials would be necessary to make such a repair, as for example when fence posts are damaged or destroyed and must be replaced to effect the repair. Currently, such repairs necessitate an often lengthy trip back to a supply and tool storage facility to gather the proper tools and materials to effect the repair, as well as acquiring the use of an appropriate vehicle for transporting these tools and materials.

An example of a current fencing device includes that described by U.S. Pat. No. 5,582,216 to Smith et al. which discloses a drawn support frame with upstanding spindle for coaxially mounting various rolls or spools of fence wire and drag, clamp, and wire installation post assemblies for wire pay-out control, wire tensioning control, and payed-out wire organization respectively. While this device provides for dispensing and tensioning various types of fence wire and numerous spools of fence wire at one time, it is limited to paying out such wire along a line of preset fence posts and does not permit a one-time fence installation along a designated fence route or the repair of a downed fence along a prior installed line of fence. Similarly, U.S. Pat. No. 5,568,900 to Conroy discloses an apparatus for dispensing various spools of fence wire via a draw bar adapted to fit into a receiver hitch of a vehicle, but suffers the same disadvantages of requiring that a preset line of fence posts exist while not permitting a one-time fence installation along a designated fence route or the repair of a downed fence along a prior installed line of fence. U.S. Pat. No. 5,632,470 to Leland and U.S. Pat. No. 4,854,521 to Farnsworth are still further examples of devices which disclose wire fencing dispensers and tensioners which suffer the disadvantages described herein above.

Accordingly there exists the current need for an inexpensive, easy to use, fully self-contained apparatus for constructing and repairing fences for enclosing farmland or livestock on a ranch.

SUMMARY OF THE INVENTION

The present invention is a trailer for the repair and construction of fences which would enclose, for example, farmland or livestock on a ranch. The trailer is a fully self-contained fencing apparatus which can be conveyed by various vehicles capable of traversing the terrain to be fenced. The trailer of the present invention is particularly useful for conserving expensive, heavy-duty conveyance vehicles such as 4-wheel drive pick-up trucks since it is a fully self-contained fencing apparatus and can easily be conveyed by smaller, less expensive vehicles such as ATVs (all-terrain vehicles). The trailer includes carriers such as tool boxes, mounting posts and mounting cylinders for carrying and storing fencing tools and materials. Discs which have centrally located spindles that protrude upward are mounted on the trailer for carrying and spooling out fence wire and can be extended outward from the trailer such that numerous lines of fence wire can be spooled out simultaneously without the lines interfering with each other. The trailer has a hitch mounted on a tongue for connecting to a vehicle. A jack is mounted on the tongue of the trailer which is used to jack up the trailer and disconnect it from the vehicle. The jack permits the trailer to be secured and left in the field after a fencing period is complete such that fencing can be immediately resumed at some later time without the need to again gather together all the necessary fencing tools and materials.

Advantages of the present invention generally include its self-contained nature which affords an efficiency and flexibility not previously available in fencing technology. Specific advantages include the elimination of numerous trips along fence lines to first install fence posts and then attach fence wire. The present invention permits a one-time traversal of significant lengths of fence line to complete the construction of those portions of the fence line. Additionally, downed fences can be repaired on-the-spot without valuable time being taken to return to storage facilities to gather the tools and materials necessary to effect such repairs. A further advantage of the present invention is the minimal equipment investment necessary to convey the trailer. An ATV fitted with a proper hitch can be used to convey the self-contained fencing trailer while larger, more capital intensive equipment such as trucks and tractors are free to be used elsewhere in a farming or ranching operation. Yet another advantage of the present invention is the ability to unhitch and secure the trailer out in the field using a pre-mounted jack such that the fencing operation can be easily interrupted with virtually no disruption or loss of time or efficiency. The fencing operation can be easily resumed by simply re-hitching the trailer previously stored in the field.

It is an object of the present invention to provide a fully self-contained apparatus for constructing and repairing fences as would be used for enclosing farmland or livestock on a ranch.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1A:
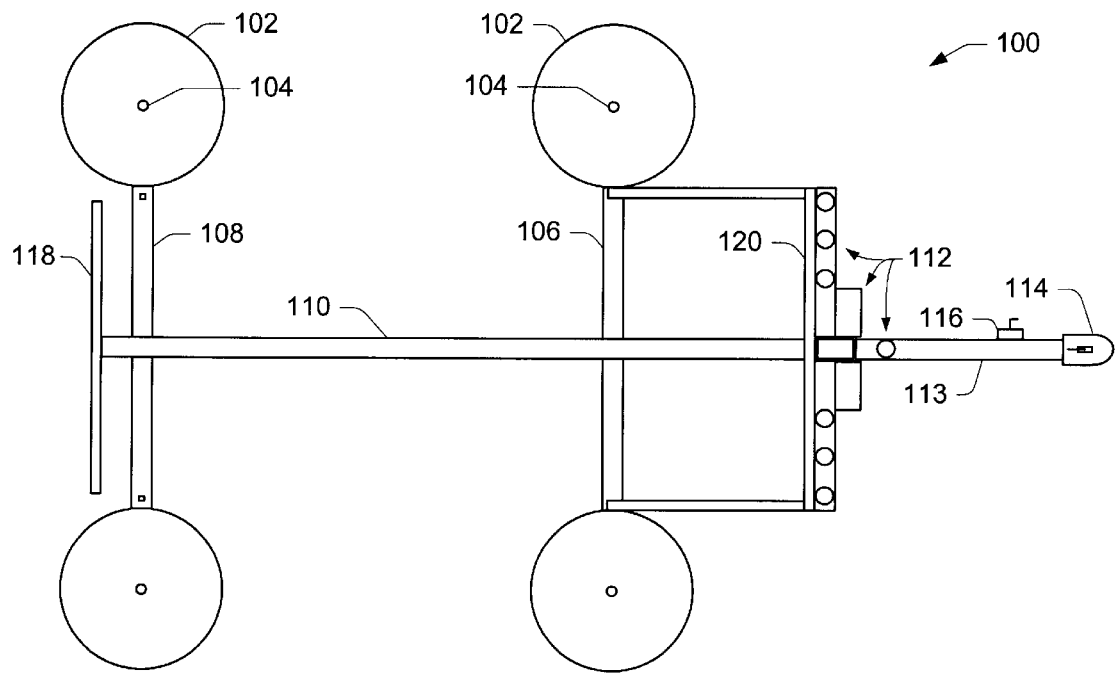
FIG. 1a is a top view drawing of the present invention.
Figure 1B:
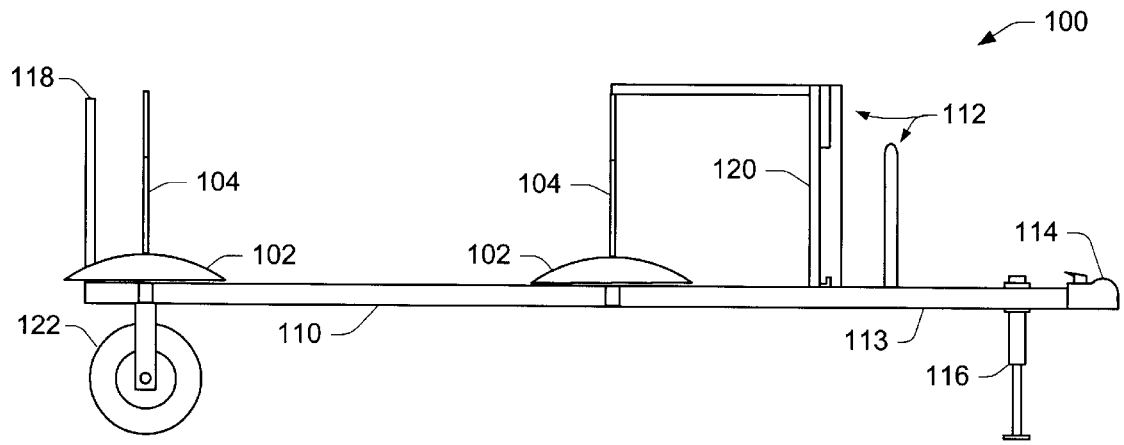
FIG. 1b is a side view drawing of the present invention.
Figure 1C:
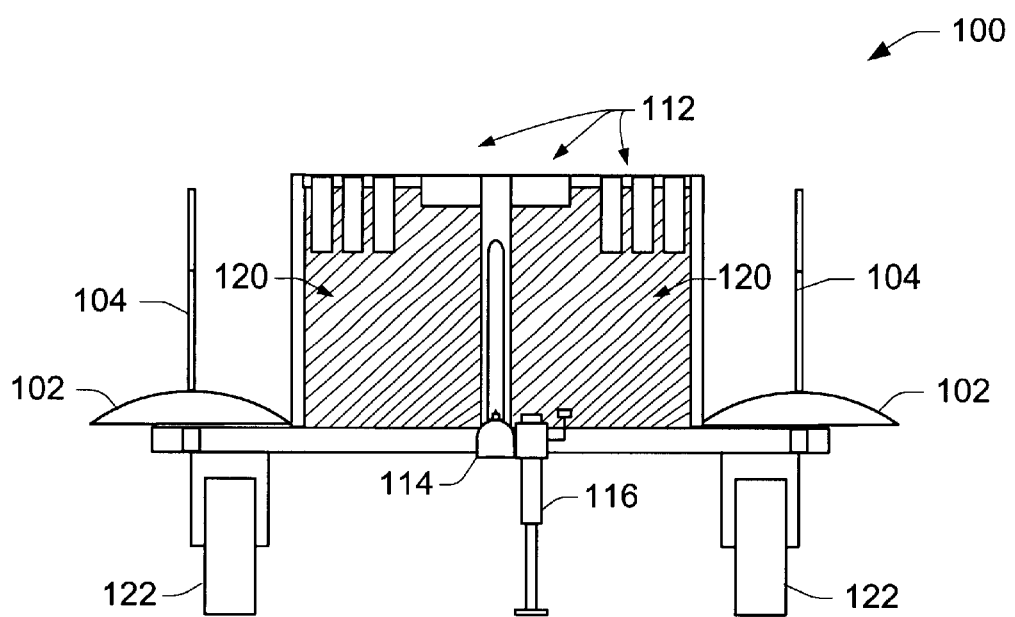
FIG. 1c is a front view drawing of the present invention.

The present invention is a trailer as illustrated in FIGS. 1a, 1b, and 1c for the repair and construction of fences. The most likely examples of fences to be constructed or repaired are fences used to enclose farmland or livestock on a ranch. The trailer 100 is a fully self-contained fencing apparatus which can be conveyed by various vehicles capable of traversing the terrain to be fenced. These vehicles include for example, but are not limited to, pick-up trucks, jeeps, sport-utility vehicles, all-terrain vehicles (ATVs) and other such off-road vehicles. The present invention provides for a relatively minimal capital investment in both the trailer 100 and the means necessary to convey the trailer 100. The straight forward design of the trailer 100 makes it inexpensive to manufacture, and a small vehicle such as an ATV fitted with a proper hitch can be used to convey the self-contained fencing trailer 100 while larger, more capital intensive equipment such as trucks and tractors are kept free to be used elsewhere in a more extensive farming or ranching operation.

As illustrated in a preferred embodiment of the present invention in FIGS. 1a, 1b, and 1c, the trailer 100 preferably includes at least four discs 102, each having a spindle 104 located at its center and protruding upward therefrom for carrying and spooling out fence wire. The discs 102 and spindles 104 are preferably made of metal but might also be made of any other hard material such as plastic or wood which can support the weight of a spool of fence wire and permit the rotation of the spool of fence wire as the wire spools out. The discs 102 are preferably of a size large enough to accommodate the largest spool of wire reasonably mountable thereon. The discs 102 are therefore most preferably about 15.5 inches in diameter. Additionally, the discs 102 and spindles 104 are preferably mounted on a front cross frame 106 and a back cross frame 108 which extend perpendicularly from a center trailer frame 110 as illustrated by FIGS. 1a, 1b, and 1c. The front and back cross frames 106, 108 are preferably made of square tube-in-tube metal piping which permits the inner tubes to slidably extend outside the ends of the outer tube such that the discs 102 and spindles 104 mounted on the inner tubes may be extended out away from the center trailer frame 110 as necessary to facilitate the simultaneous and tangle-free spooling out of wire from each of the wire spools.

In a preferred embodiment of the present invention, the trailer 100 additionally has a carrier 112 for carrying fencing items. The carrier 112 preferably consists of various tool boxes, mounting posts, mounting cylinders, and combinations thereof for storing and transporting fencing tools. Fencing tools include but are not limited to tools such as post hole diggers, post drivers, wire stretchers, wire cutters, pliers, wire clippers, wire staplers, shovels, tamping bars, and combinations thereof.

In addition to the frame of the trailer 100 including the center trailer frame 110, the front cross frame 106 and the back cross frame 108 which extend perpendicularly from the center trailer frame 110, the trailer 100 of a preferred embodiment of the present invention also has a tongue 113 which extends forward from the center trailer frame 110. The tongue 113 has a hitch 114 for connecting the trailer 100 to a vehicle. The trailer hitch 114 is preferably but not necessarily a ball hitch. The tongue 113 also has permanently mounted jack 116. The jack facilitates hitching and unhitching the trailer 100 to the vehicle used to tow the trailer 100. The trailer wheels 122 are preferably mounted under the back cross frame 108 on axles appropriate for off-road use. The trailer 100 also has a backstop 118 for bracing fence posts and a front-stop 120 for bracing fence posts and mounting tool carriers 112. The front-stop 120 is preferably a framed wire mesh screen.

Figure 2A:
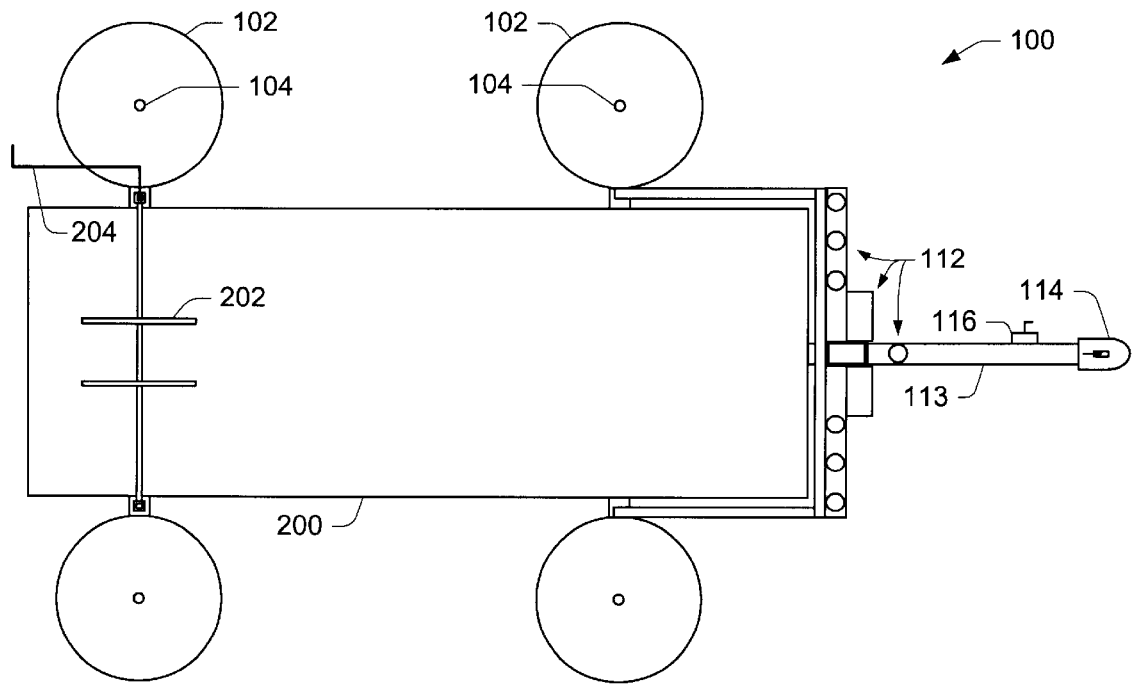
FIG. 2a is a top view drawing of the present invention with the added options of a removable tray for carrying electric fence posts, a spool for carrying electric fence wire, and a crank for cranking said spool and dispensing said electric fence wire.
Figure 2B:
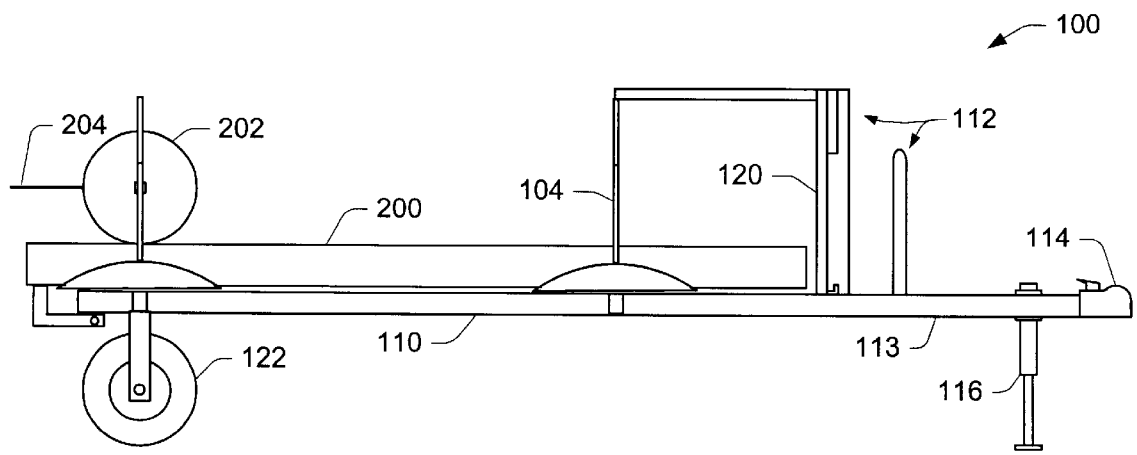
FIG. 2b is a side view drawing of the present invention with the added options of a removable tray for carrying electric fence posts, a spool for carrying electric fence wire, and a crank for cranking said spool and dispensing said electric fence wire.

In a second preferred embodiment of the present invention, as illustrated in FIGS. 2a, and 2c, the trailer 100 includes the added options of a removable tray 200 for carrying electric fence posts, a spool 202 for carrying electric fence wire, and a crank 204 for cranking the spool and dispensing the electric fence wire.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A trailer for fence repair and construction, comprising:
   (a) a carrier mounted on said trailer for carrying fencing items;
   (b) a disc having a spindle located at its center and protruding upward therefrom, said disc and said spindle extendibly mounted on said trailer for carrying and spooling out fence wire;
   (c) a tongue extending from said trailer having a hitch for connecting said trailer to a vehicle;
   (d) a jack mounted on said tongue for jacking up said tongue and unhitching said trailer from said vehicle; and
   (e) a backstop for bracing fence posts.

2. The trailer as recited in claim 1, wherein said carrier is a plurality of carriers selected from the group consisting of tool boxes, mounting posts, mounting cylinders, and combinations thereof.

3. The trailer as recited in claim 1, wherein said disc is a plurality of discs, at least one of said plurality of discs being located approximately at each corner of said trailer.

4. The trailer as recited in claim 1, further comprising a front-stop for bracing said fence posts and for mounting said carrier.

5. The trailer as recited in claim 4, wherein said front-stop is a framed wire mesh screen.

6. The trailer as recited in claim 1, wherein said hitch is a ball hitch.

7. The trailer as recited in claim 1, further comprising a removable tray for carrying electric fence posts.

8. The trailer as recited in claim 7, further comprising a spool for carrying electric fence wire.

9. The trailer as recited in claim 8, further comprising a crank for cranking said spool and dispensing said electric fence wire.

* * * * *